United States Patent [19]

Yamanaka

[11] 4,059,304
[45] Nov. 22, 1977

[54] ENERGY ABSORBING APPARATUS FOR VEHICLES

[75] Inventor: Akira Yamanaka, Yokohama, Japan

[73] Assignee: Mitsubishi Jidosha Kogyo Kabushiki Kaisha, Japan

[21] Appl. No.: 647,913

[22] Filed: Jan. 9, 1976

[30] Foreign Application Priority Data

Jan. 14, 1975    Japan .............................. 50-7894[U]

[51] Int. Cl.² .......................... B62D 1/00; F16F 7/12
[52] U.S. Cl. ................................. 296/35 R; 188/1 C
[58] Field of Search ................ 296/35 R, 35 A, 35 B; 293/63, 65; 188/1 C; 180/82 R

[56] References Cited

U.S. PATENT DOCUMENTS

| | | | |
|---|---|---|---|
| 2,882,090 | 4/1959 | Sewelin | 296/35 R |
| 3,381,995 | 5/1968 | Carter | 296/35 R |
| 3,757,900 | 9/1973 | Gischler | 188/1 C |
| 3,831,998 | 8/1974 | Hewitt | 296/35 R |

Primary Examiner—Philip Goodman
Attorney, Agent, or Firm—Robert E. Burns; Emmanuel J. Lobato; Bruce L. Adams

[57] ABSTRACT

An energy absorbing apparatus that absorbs impact energy due to the collision of a vehicle. It draws a swingable member through a die effectively in such a manner as to subject the swingable member to plastic deformation based on the relative movement between the vehicle's body and frame.

16 Claims, 16 Drawing Figures

ENERGY ABSORBING APPARATUS FOR VEHICLES

DETAILED DESCRIPTION OF THE INVENTION

This invention relates to an energy absorbing apparatus for vehicles.

BACKGROUND OF THE INVENTION

Conventionally, an energy absorbing apparatus for a vehicle, particularly a truck having great weight, has unavoidably been very large in size, in order to absorb impact energy that might arise when it collides head-on with some obstacle. So there has been a problem that such a large energy absorbing apparatus cannot be provided at the front of a truck etc.

The object of this invention is to solve the aforementioned problem and to provide an energy absorbing apparatus that absorbs impact energy due to the collision of a vehicle by drawing through a die supported by either of the vehicle's body or frame a member adapted to be drawn therethrough when said body and frame move with respect to each other, supported by the other of the body or frame, in such a manner as to subject said member to plastic deformation.

SUMMARY OF THE INVENTION

In order to attain this object, an energy absorbing apparatus for vehicles according to this invention comprises, in combination, a first supporting part having a bearing surface formed on either of a vehicle's frame or body, a die whose spherical or cylindrical portion is swingably supported by the bearing surface of said first supporting part, a second supporting part having a bearing surface formed on the other of said frame or body, a guide member whose spherical or cylindrical portion is swingably supported by the bearing surface of said second supporting part, and a member to be drawn whose large-diameter portion is fitted in a die hole of said die so as to be drawn therethrough and small-diameter portion is fixed through a guide hole of said guide member. The body moves with respect to said frame when impact force exceeding a given value is applied on the vehicle, as a consequence of which said die and member to be drawn are turned on said first and second supporting parts, and then said member is drawn through said die while undergoing plastic deformation, thereby absorbing the kinetic energy of the body.

BRIEF DESCRIPTION OF THE DRAWINGS

Now energy absorbing apparatus for vehicles embodying this invention will be described with reference to the accompanying drawings, in which:

FIGS. 2 through 5 illustrate a first embodiment of this invention, of which FIG. 2 is a longitudinal cross section, FIG. 3 is a cross-sectional view taken along the line III—III of FIG. 2, and FIGS. 4 and 5 are schematic views illustrative of different conditions.

FIGS. 9 through 12 illustrate a fourth embodiment of this invention, of which FIG. 9 is a longitudinal cross section, FIG. 10 is a cross section taken along the line X—X of FIG. 9, and FIGS. 11 and 12 are schematic views illustrating operating conditions, corresponding to FIG. 9.

FIGS. 15 and 16 illustrate a seventh embodiment of this invention, of which FIG. 15 is a longitudinal cross section and FIG. 16 is a cross section taken along the line XVI—XVI of FIG. 15.

DESCRIPTION OF THE PREFERRED EMBODIMENTS

Figure 1:
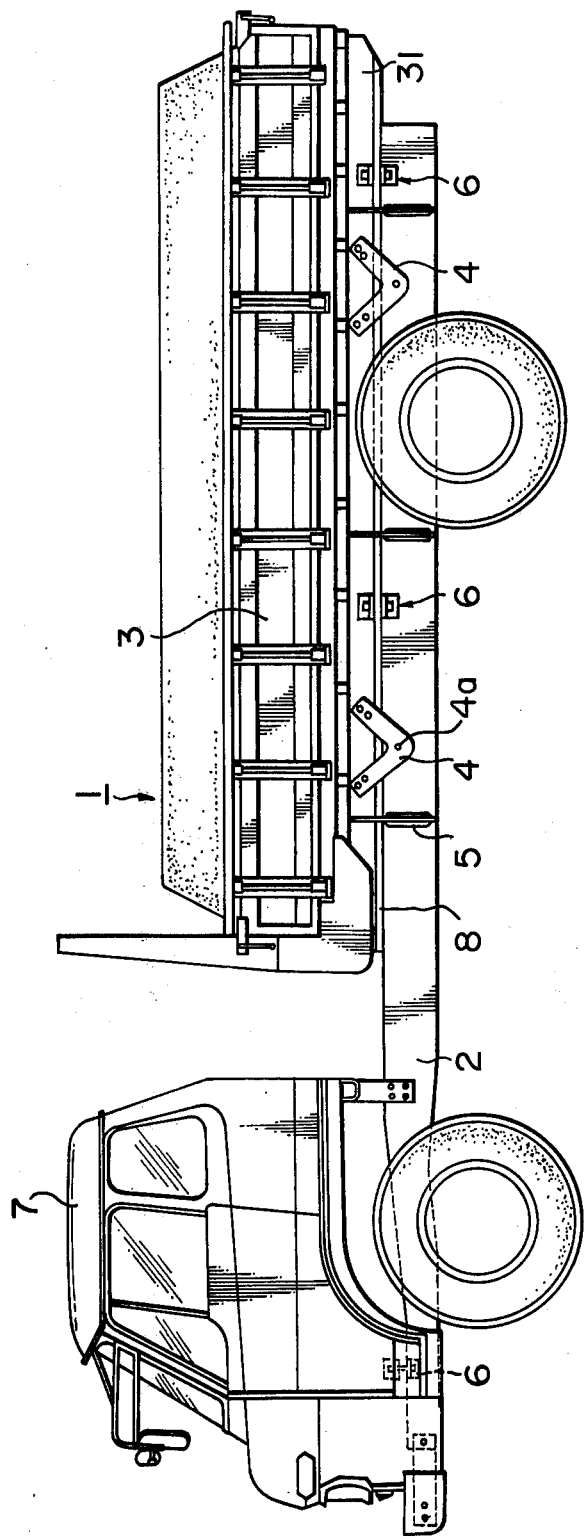
FIG. 1 is a side elevation of a truck equipped with an apparatus according to this invention.
Figure 2:
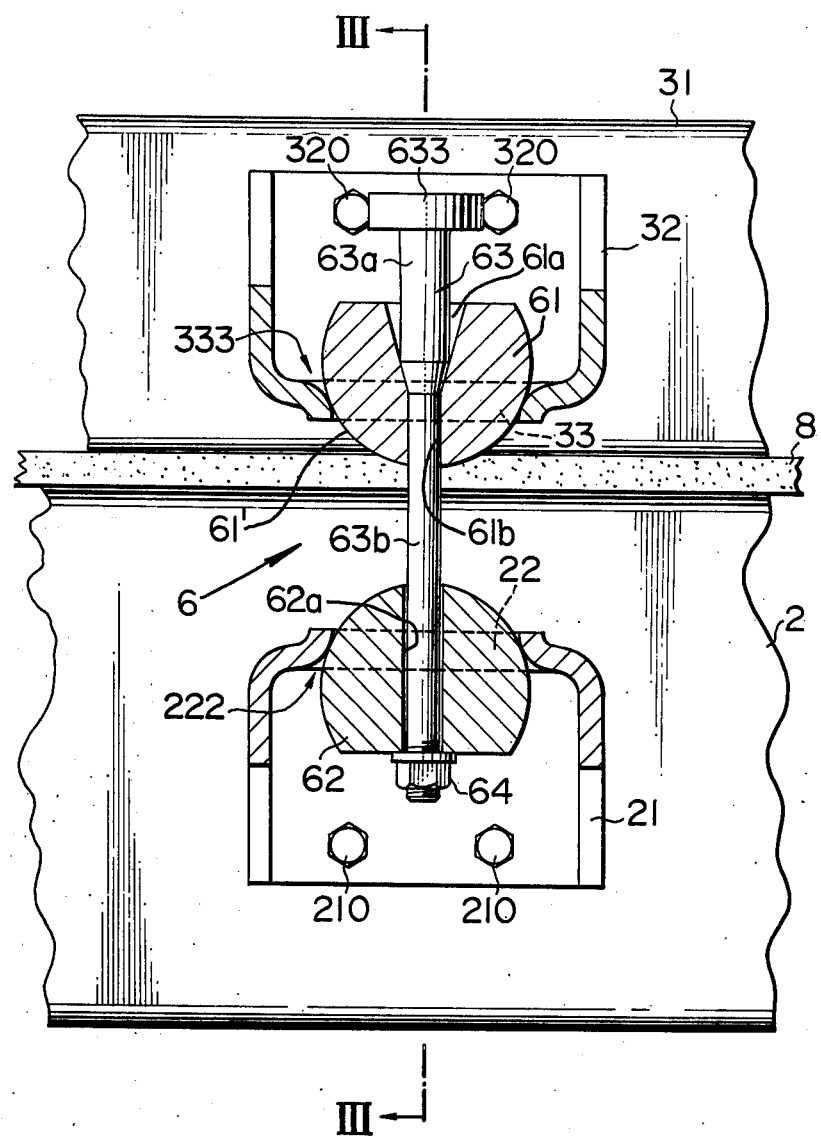
Figure 3:
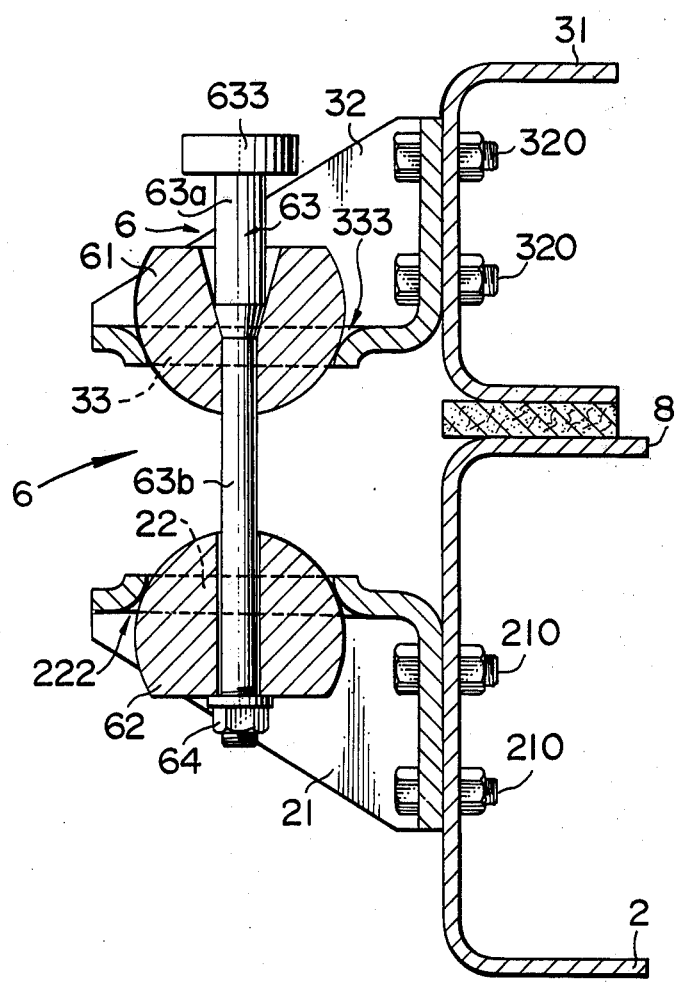

In the first embodiment shown in FIGS. 1 through 5, a burden carrier 3 serving as a body is placed on a frame 2 of a cab-over type truck 1. The burden carrier 3 is fixed to the frame 2 by means of V-shaped holders 4 each fixed by a single shear pin bolt 4a at its apex to the frame 2 and by several bolts to a longitudinal sill 31 under the burden carrier 3. In addition U-bolts 5 are provided, which extend between the frame 2 and the longitudinal sill 31 under the burden carrier 3 to further secure the carrier 3 to the frame 2. According to the invention, each of a plurality of the energy absorbing apparatus 6 has brackets 21 and 32 fitted to the frame 2 and the longitudinal sill 31 below the burden carrier 3 by bolts 210 and 320, respectively. The first bracket 32 is provided with an opening 33, along the periphery of which is formed a first supporting part 333 comprising a bearing surface. A die element 61 having an outer die body portion with a substantially hemispherical surface is fitted in the opening 33 so that the outer surface of the guide element, formed by rotation of a circularly curved generatrix 61' about a central axis of the die element, is supported by a linearly contacting bearing surface on an integral die supporting part 333 of the first bracket 32.

The second bracket 21 is formed with an opening 22 that underlies opposite to said opening 33. An integral guide supporting part 222 comprising a bearing surface is formed along the periphery of said opening 22. A guide element 62 having an outer guide body portion with a substantially hemispherical surface similar to that of the die element is fitted in the opening 22 so that the curved surface thereof is supported by the linearly contacting bearing surface that makes up the second supporting part 222 of the second bracket 21.

An elongate bar-like member 63 to be drawn (hereinafter referred to as "drawn member"), which has a large-diameter, downwardly tapered end portion 63a and a small-diameter portion 63b downwardly extending the same, and serves as an energy absorbing member, is provided, with the tapered end of the large-diameter portion 63a being inserted in a correspondingly tapering upper part 61a of a central die hole 61b in the die element 61 so as to be drawn therethrough. The small-diameter portion 63b of the member 63 passes through a central guide hole 62a in the guide element 62, and the end of the member 63 is fastened with a nut 64.

The drawn member 63 is formed with a stopper 633 at the other end of the large-diameter portion 63a, which restricts the amount of drawing through the die 61 that takes place when the vehicle collides with something.

A cabin 7 is mounted on the front end of the frame 2, and an energy absorbing apparatus 6 is interposed also between this cabin 7 and the frame 2 (see FIG. 1).

Further, a friction plate 8 is provided between the longitudinal sill 31 under the burden carrier or body and the frame 2.

Figure 4:
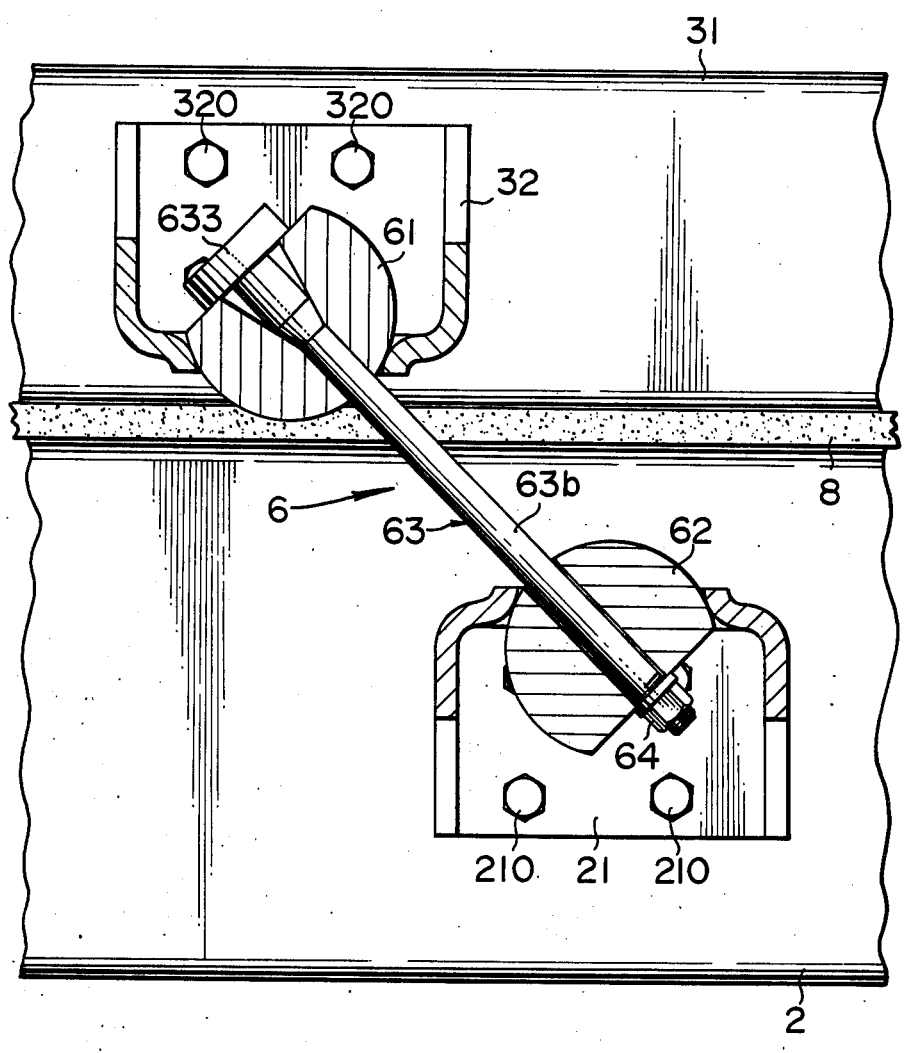

Owing to the above-described construction, when the truck 1 collides head-on with some obstacle, the single bolts of the V-shaped holders 4 are sheared by the resultant impact force, whereupon the burden carrier 3 moves forward under the influence of inertial force. Thereby the die element 61 fitted in the first bracket 32 also moves forward, turning counterclockwise in FIG. 2, as does the guide element 22 in bracket 21. As a consequence, the drawn member 63 is drawn through the die 61 turning counterclockwise, and undergoes plastic deformation, the result of which is illustrated in FIG. 4. Thereby the impact force and the kinetic energy of the burden carrier 3 are absorbed.

Figure 5:
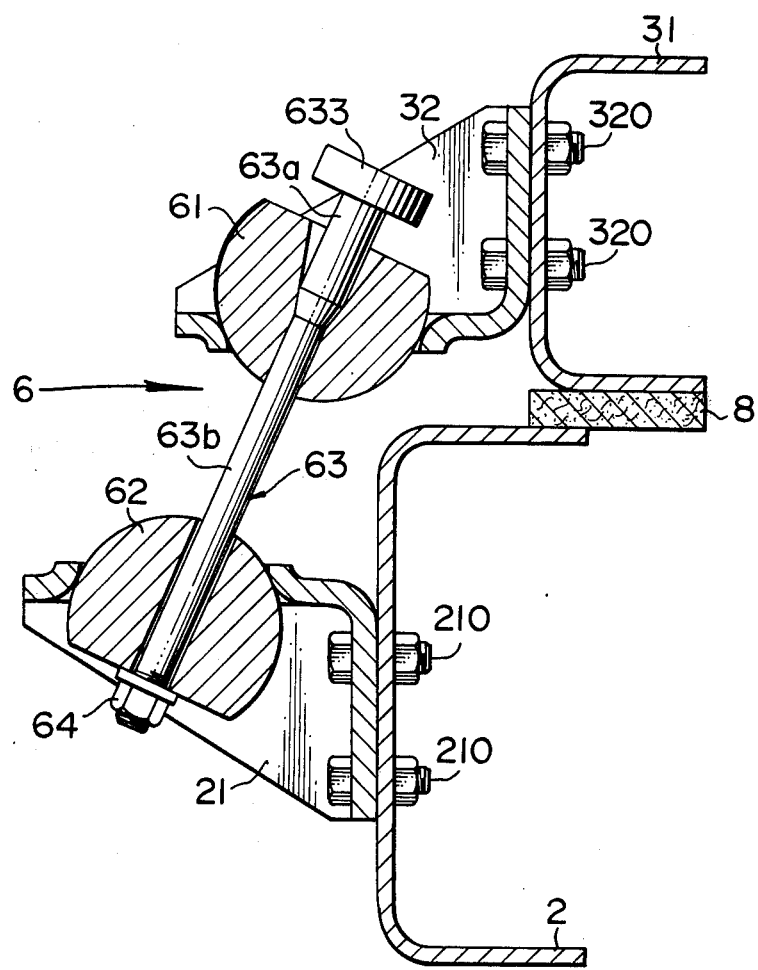

Thus, when the truck 1 collides head-on with some obstacle, the burden carrier 3 which normally represents more than half of the total weight of the truck with the cargo loaded thereon, moves forward. Consequently, the peak load due to the collision is reduced, and the kinetic energy of the burden carrier 3 is absorbed by the energy absorbing apparatus 6. Therefore, even a relatively small energy absorbing mechanism that may be fitted at the front of the vehicle (at left in FIG. 1) can sufficiently relieve impact forces applied thereon. Also, whenever and in whatever direction the burden carrier 3 moves, irrespective of the direction from which impact force is applied, the energy absorbing apparatus 6 functions to achieve the same energy absorbing effect as in the case of the above-mentioned head-on collision, because the die 61 and the drawn member 63 can turn in any direction on the spherically curved surfaces of the respective brackets 32 and 21. For instance, if the truck is hit by another vehicle in the flank, the energy absorbing apparatus 6 functions as shown in FIG. 5.

Figure 6:
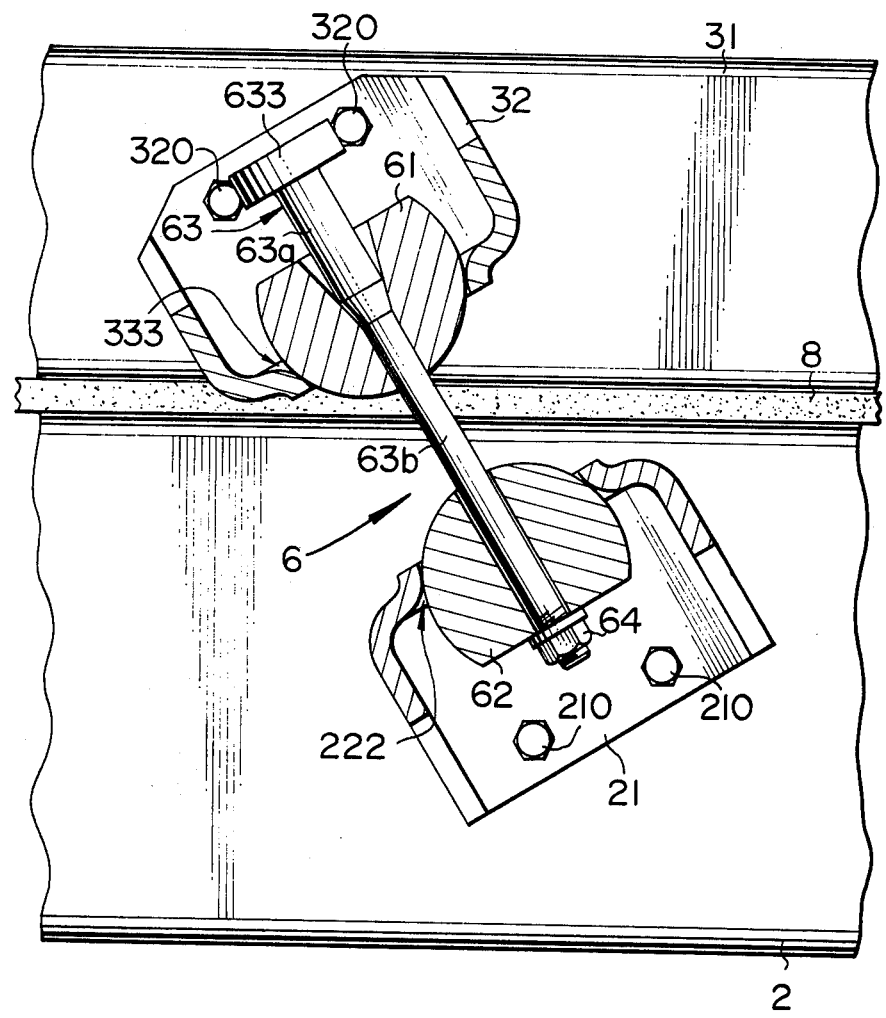
FIG. 6 is a longitudinal cross section similar to FIG. 2, but showing a second embodiment of this invention.

As shown in the second embodiment given in FIG. 6, the same energy absorbing apparatus is installed in a different orientation. The drawn member 63 may, as shown here, be preset aslant in a vertical plane disposed in the longitudinal direction of the vehicle. The advantage of this embodiment is that, when the vehicle collides head-on with some obstacle, the drawn member 63, inclined forward in advance, is subjected to the drawing action sooner, thus increasing its effect, than in the case of the first embodiment.

Figure 7:
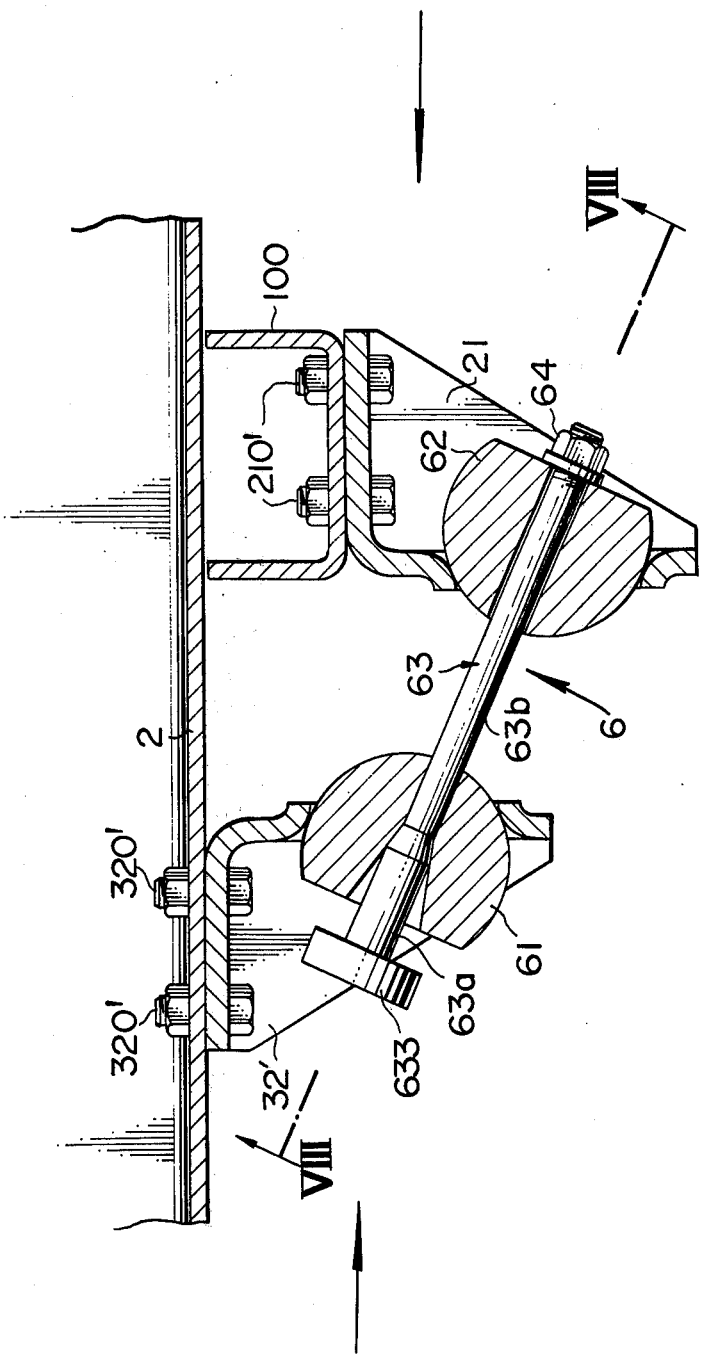
FIGS. 7 and 8 show a third embodiment of this invention, FIG. 7 being a cross-sectional view taken along the line VII—VII of FIG. 8, and FIG. 8 a cross-sectional view along the line VIII-VIII of FIG. 7.
Figure 8:
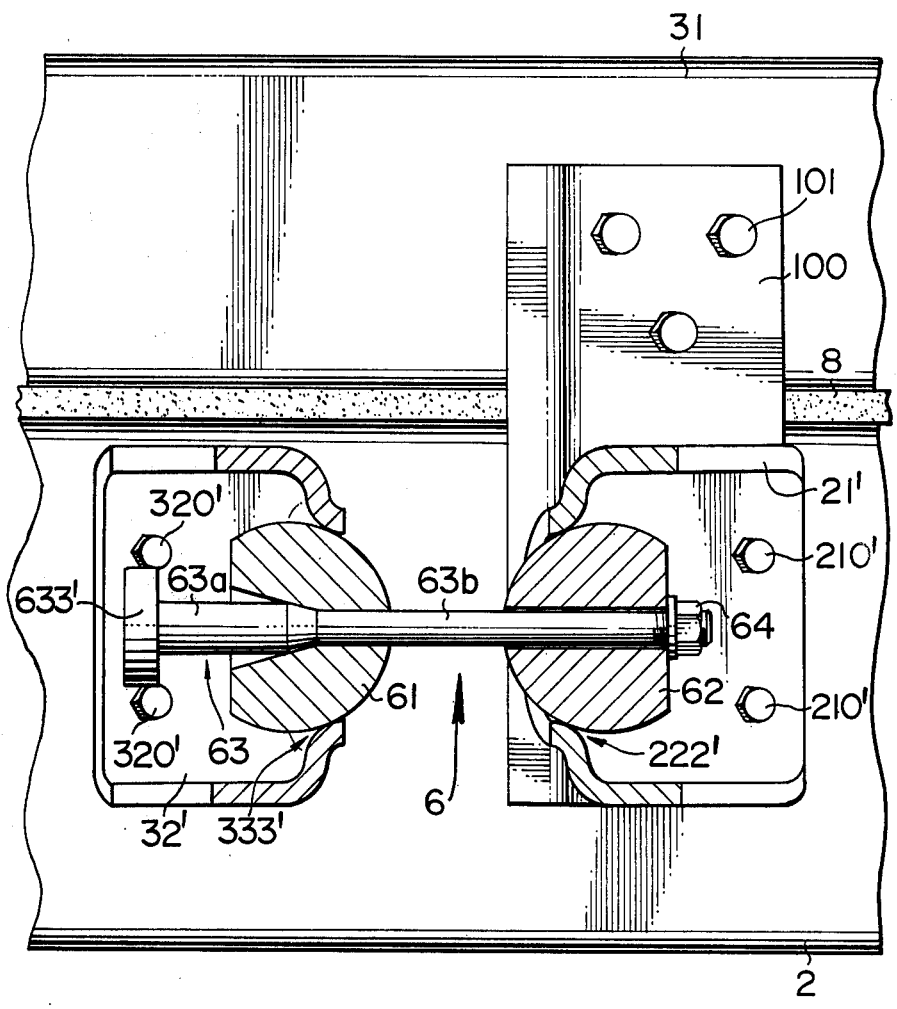
Figure 9:
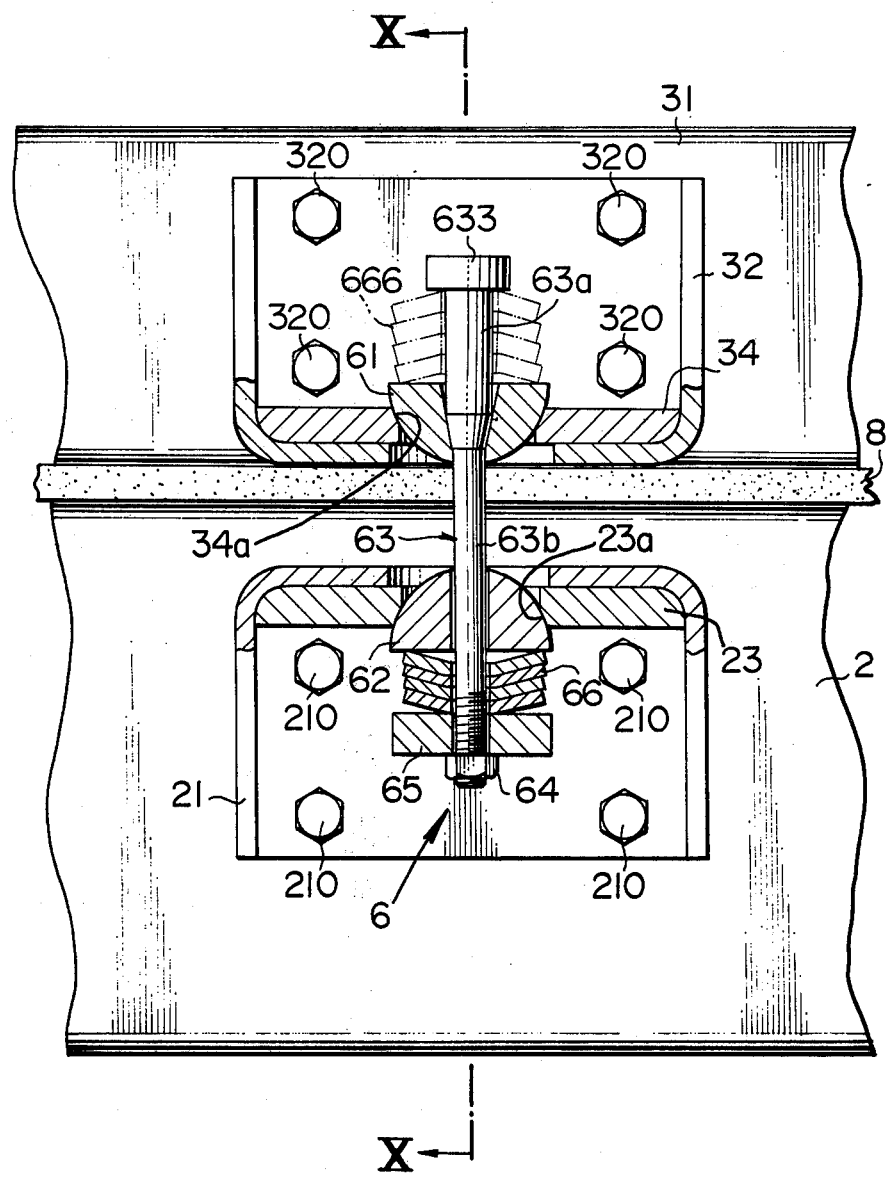
Figure 10:
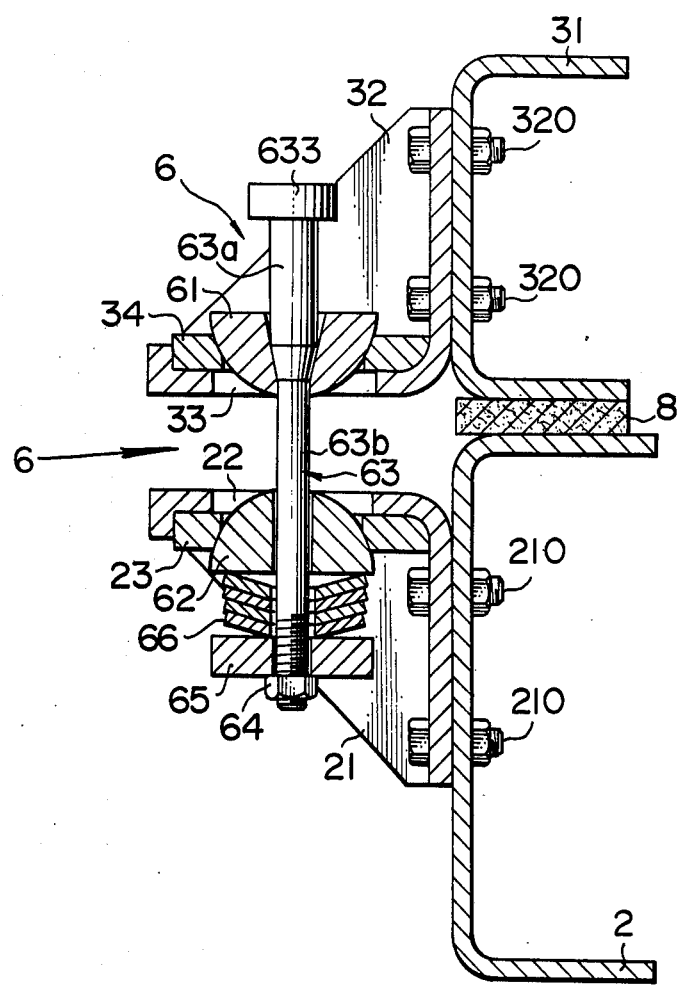

Further, as illustrated in FIGS. 7 and 8, the drawn member 63 of the same energy absorbing apparatus 6 may be preset aslant in a horizontal plane extending along the vehicle. In this third embodiment, the die 61 is held by a first bracket 32' fitted to the frame 2, the guide member 62 is held by a second bracket 21' fastened to an arm 100 made of a steel channel extending downward from the longitudinal sill 31 to which said arm 100 is fixed with bolts 101, and the drawn member 63 extends therebetween.

When a vehicle equipped with this third embodiment thus constructed receives impact force, the drawn member 63 is effectively drawn by the die 61 either in the longitudinal or transverse direction of the vehicle, undergoing plastic deformation, whereby the kinetic energy of the burden carrier 3 is absorbed and the safety of the driver in the cabin 7 is insured. Also, if the drawn member 63 is set horizontally in parallel with the longitudinal direction of the vehicle, it can effectively absorb the kinetic energy of the vehicle when it comes into a head-on collision or it is struck from behind.

In the fourth embodiment of this invention shown in FIGS. 9 through 12, the energy absorbing apparatus 6' comprises a receiving member 34, fixed to the first bracket 32 fitted to the longitudinal sill 31, and the spherical portion of the die 61 rests on a first supporting part, that is, as a spherically curved bearing surface 34a formed on said receiving member 34. Similarly, another receiving member 23 is fixed to the second bracket 21 fitted to the frame 2, and the spherical portion of the guide member 62 rests on a spherically curved bearing surface 23a formed on said receiving member 23. The small-diameter portion 63b of the drawn member 63 passed through the guide hole in the guide member 62 is fastened to this member by a nut 64, through a retainer 65, with a disk spring 66 or other elastic member, such as a coiled spring, interposed between said guide member 62 and retainer 65.

Figure 11:
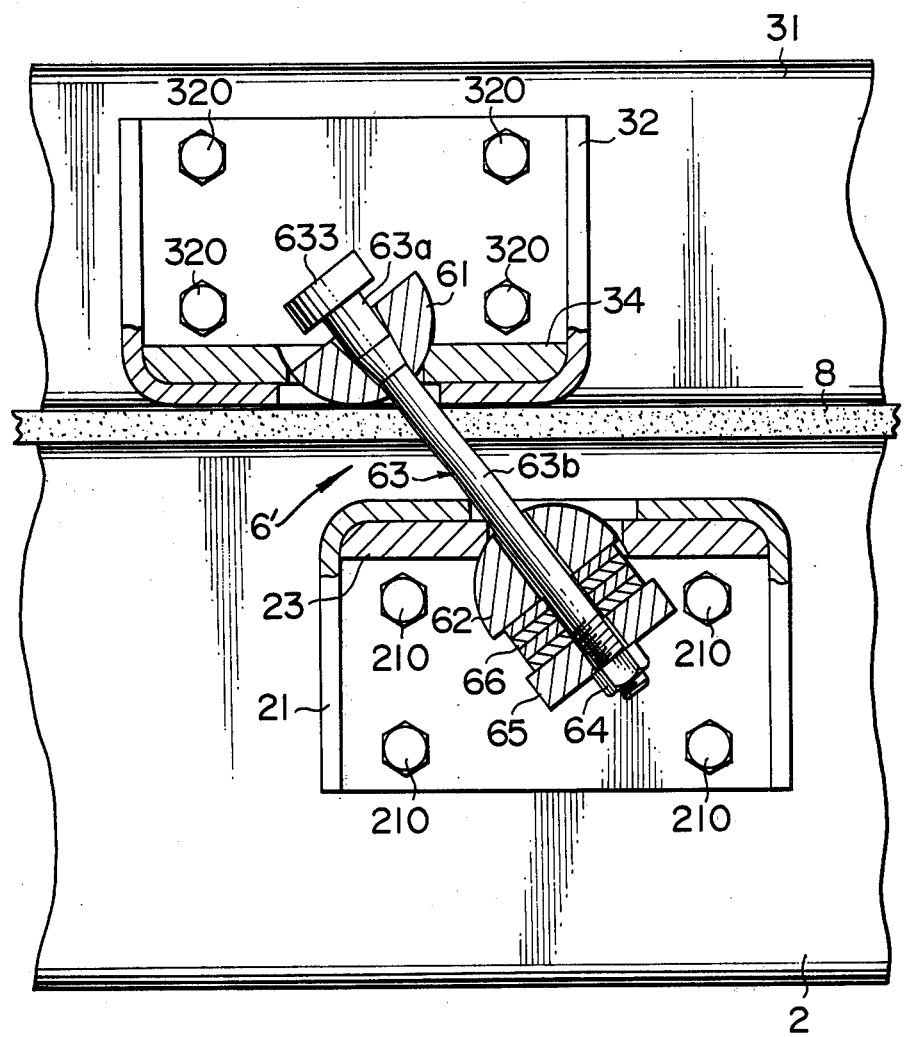
Figure 12:
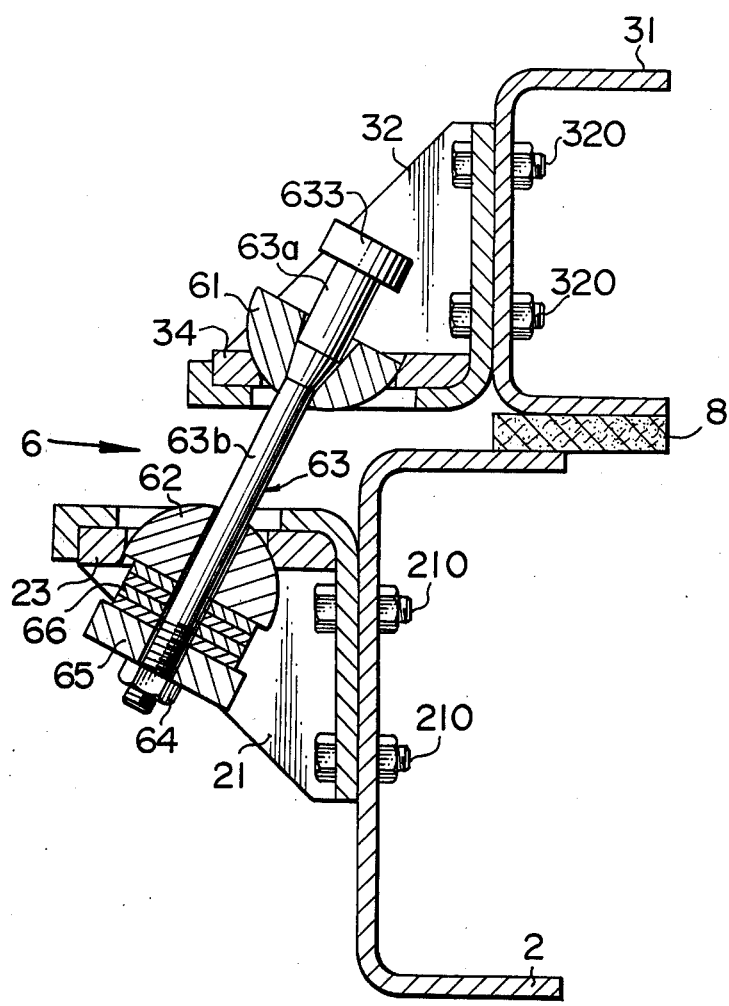

Accordingly, when an impact force is applied from before or from either side to a truck 1 equipped with this embodiment, the longitudinal sill 31 of the burden carrier 3 moves with respect to the frame 2 as illustrated in FIG. 11 or 12, the die 61 pulls the drawn member 63, and thereby initially and elastically distorts compresses the disc spring 66, thereafter, if the impact force exceeds a given value, it draws the drawn member 63 to absorb the kinetic energy of the burden carrier 3. Because the drawing of the drawn member 63 through the die 61 is accomplished only after the compression of the disc spring 66, this embodiment can initially relieve the impact force working on the burden carrier 3 instead of beginning the drawing of the drawn member at once, as in the foregoing embodiments. Further, as shown by a dotted line in FIG. 9, a disc spring 666 may be inserted as an elastic member between the die 61 and a stopper 633.

Needless to say, the impact force working on the cabin 7 can similarly be relieved by the energy absorbing apparatus 6 interposed between the cabin 7 and the frame 2.

Figure 13:
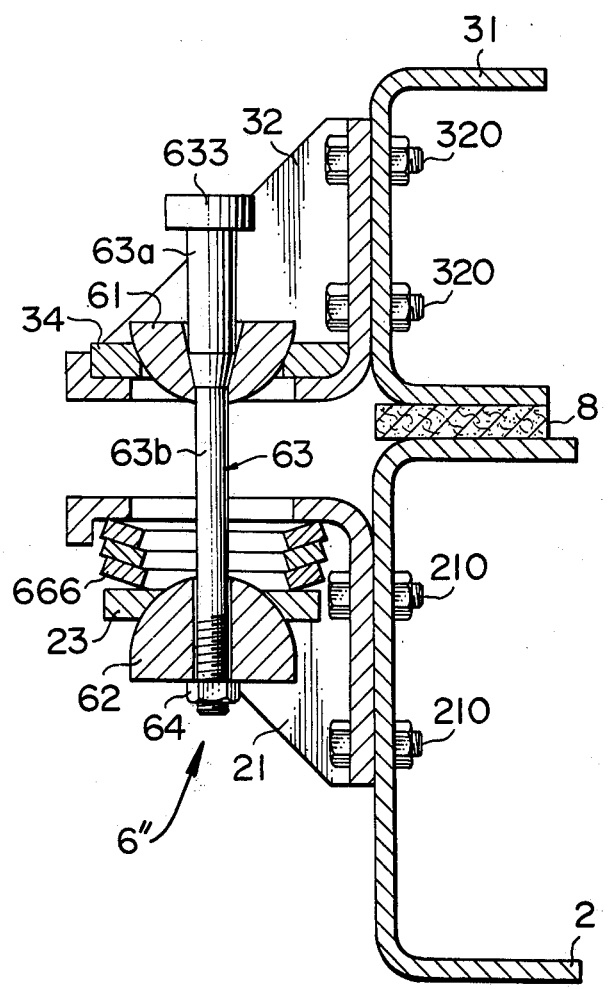
FIG. 13 is a cross section showing a fifth embodiment of this invention.

In the fifth embodiment of this invention shown in FIG. 13, the receiving member 23 of apparatus 6", having the second supporting part to support the spherical portion of the guide member 62 is held to the second bracket 21 through a disc spring 666. In this embodiment too, when the vehicle collides, compression of the disc spring 666 takes place before the large-diameter portion 63a of the drawn member 63 is drawn through the die 61.

Figure 14:
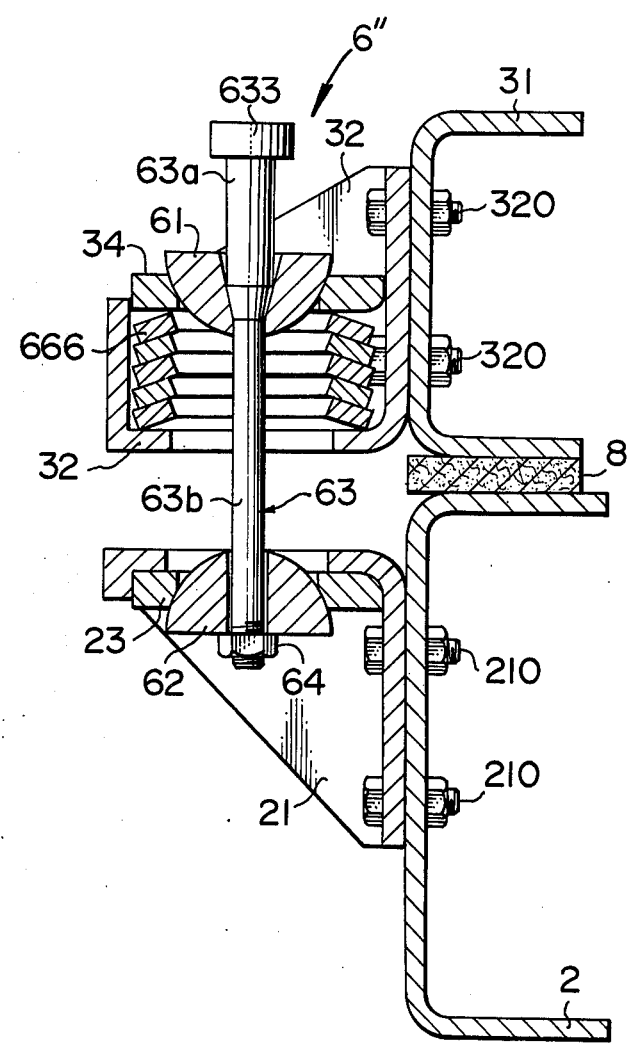
FIG. 14 is a cross section of a sixth embodiment of this invention.

In the sixth embodiment of this invention shown in FIG. 14, the receiving member 34 of apparatus 6''', having the first supporting part to support the spherical portion of the die 61 is held to the first bracket 32 through the disc spring 666, and substantially the same operation and result are obtained aas with the embodiment of FIG. 13.

Figure 15:
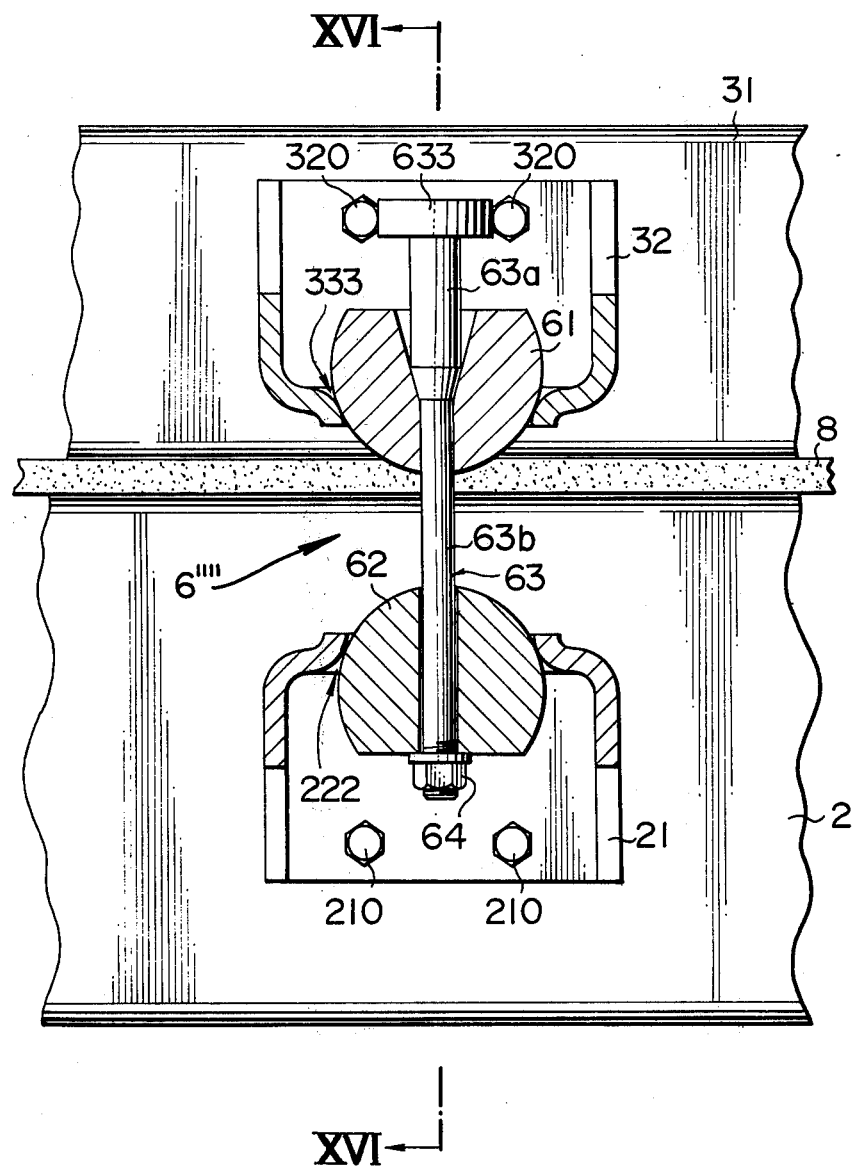
Figure 16:
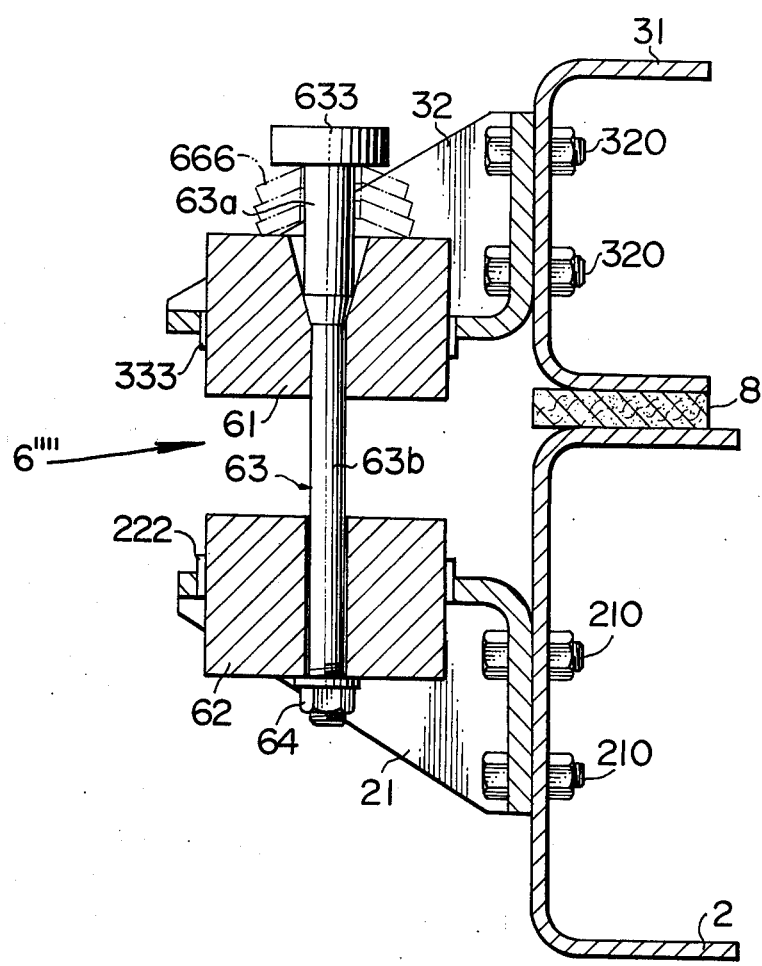

In the seventh embodiment of this invention shown in FIGS. 15 and 16, the die 61 of apparatus 6'''', through which the large-diameter portion 63a of the drawn member 63 is drawably passed and the guide member 62 through which the small-diameter portion 63b of the drawn member 63 is passed, both have cylindrically shaped bodies which are supported by bearing surfaces formed along an opening 333 in the first bracket 32 and an opening 222 in the second bracket 21, respectively, so that they are rotatable about horizontal axes transverse of the vehicle. The drawn member 63 normally is set upright with respect to the longitudinal direction of the vehicle. But when the vehicle comes into a head-on collision, the drawn member 63 inclines forward to receive the drawing action of the die 61, thus achieving the same energy absorbing effect as with the above-mentioned embodiments.

In this seventh embodiment too, as illustrated by a dotted line in FIG. 16, the disc spring 666 or a coiled spring may be interposed between the die 61 and the stopper 633.

As described in the foregoing, the vehicle's energy absorbing apparatus according to this invention surely and smoothly draws the drawn member, subjecting it to plastic deformation, when the vehicle equipped therewith comes into a collision in any direction, thus sufficiently absorbing the kinetic energy of the vehicle and contributing to the ensuring of safety.

What is claimed is:

1. Impact force absorbing apparatus for vehicles, comprising:
    a die-supporting bracket member disposed to be rigidly mounted on a first portion of a vehicle, the bracket member having means defining a die bearing surface;
    a die element having a die hole and having a curved die body surface which constitutes a surface of rotation of a generatrix, the die element being swingably supported by the die bearing surface and that surface being similar to a portion of the die body surface;
    a guide-supporting bracket member disposed to be rigidly mounted on a second portion of the vehicle, the latter member having means defining a guide bearing surface;
    a guide element having a guide hole and having a curved guide body surface similar to the die bearing surface; and
    an elongate, drawable and plastically deformable member having, in axial succession, a large-diameter portion extending from one end of the die hole and a small-diameter portion extending through the die hole and into, through and from the guide hole, the deformable member being fastened to the guide element, remotely from the die element;
    whereby, when an impact force exceeding a given value moves the first portion relative to the second portion of the vehicle, both elements turn on their respective bearing surfaces and subject the deformable member to plastic deformation by drawing the large-diameter portion into the die hole to absorb the impact force.

2. Apparatus according to claim 1 additionally including a stop member secured to a free end portion of the large-diemater portion of the deformable member and outwardly extending therefrom beyond the circumference of the die hole to prevent drawing of the deformable member entirely through the die element.

3. Apparatus according to claim 1 in which the large-diameter portion of the deformable member has a part tapered toward the small-diameter portion, the die hole having a similarly tapered end part and the tapered part being normally received in the tapered end part.

4. Apparatus according to claim 1 in which the curved die body surface constitutes a surface of rotation of a circular generatrix, whereby the surface has a spherical shape.

5. Apparatus according to claim 1 in which the means defining the bearing surfaces are integral parts of the bracket members.

6. A vehicle with impact force absorbing apparatus, comprising;
    a first vehicle portion having a die-supporting bracket member rigidly mounted thereon, the bracket member having means defining a die bearing surrace and having a die element which has a die hole and a curved die body surface constituting a surface of rotation of a generatrix, the die element being swingably supported by the die bearing surface and that surface being similar to a portion of the die body surface;
    a second vehicle portion having a guide-supporting bracket member rigidly mounted thereon, the latter member having means defining a guide bearing surface, and having a guide element which has a guide hole and a curved guide body surface similar to the die body surface, the guide element being swingably supported by the guide bearing surface and that surface being similar to the die bearing surface; and
    an elongate, drawable and plastically deformable member having in axial succession, a large-diameter portion extending from one end of the die hole and a small-diameter portion extending through the die hole and into, through and from the guide hole, the deformable member being fastened to the guide element, remotely from the die element; C
    whereby, when an impact force exceeding a given value moves the first vehicle portion relative to the second vehicle portion, both elements turn on their respective bearing surfaces and subject the deformable member to plastic deformation to absorb the impact force.

7. A vehicle according to claim 6 additionally including a friction plate interposed between the first and second vehicle portions to frictionally control the moving of the first vehicle portion relative to the second.

8. A vehicle according to claim 6 additionally including shear pin means interposed between the first and second vehicle portions to define the impact force exceeding a given value which moves the first vehicle portion relative to the second.

9. A vehicle according to claim 7 wherein the shear pin means comprise holders, each having a V-shape and disposed between and secured to the first and second vehicle portions, and a single shear pin bolt for the securing of each holder to one of said portions, extending through an apex portion of the V-shape.

10. A vehicle according to claim 6 in which the bracket members are so mounted on the respective vehicle portions that the deformable member extends in a substantially upright direction until an impact force moves the first vehicle portion relative to the second.

11. A vehicle according to claim 6 in which the vehicle is a truck, the first vehicle portion is a burden carrier, and the second is a vehicle frame supporting the burden carrier.

12. A vehicle according to claim 6 in which the first vehicle portion is a cabin and the second is a vehicle frame supporting the cabin.

13. A vehicle with impact force absorbing apparatus, comprising; first and second portions of a vehicle;

a die-supporting bracket member rigidly mounted on the first portion of the vehicle, the bracket member having means defining a die bearing surface;

a die element having a die hole and having a curved die body surface which constitutes a surface of rotation of a generatrix, the die element being swingably supported by the die bearing surface and that surface being similar to a portion of the die body surface;

a guide-supporting bracket member rigidly mounted on the second portion of the vehicle, the latter member having means defining a guide bearing surface;

a guide element having a guide hole and having a curved guide body surface similar to the die body surface, the guide element being swingably supported by the guide bearing surface and that surface being similar to the die bearing surface; and an elongate, drawable and plastically deformable member having, in axial succession, a large-diameter portion extending from one end of the die hole and a small-diameter portion extending through the die hole and into, through and from the guide hole, the deformable member being fastened to the guide element, remotely from the die element.

14. A vehicle according to claim 13 in which the bracket members are so mounted on the respective vehicle portions that the deformable member normally extends obliquely in a plane parallel to a longitudinal direction of the vehicle.

15. A vehicle according to claim 13 in which the bracket members are so mounted on the respective vehicle portions that the deformable member extends in a substantially horizontal direction, at an angle to a horizontal direction of the vehicle.

16. A vehicle according to claim 13 in which the die body surface and the guide body surface are cylindrical and have axes transverse of a longitudinal direction of the vehicle.

* * * * *